United States Patent
Staltmeir et al.

(10) Patent No.: US 6,957,571 B2
(45) Date of Patent: Oct. 25, 2005

(54) ELECTRO MECHANICAL BRAKE TIGHTENING DEVICE

(75) Inventors: Josef Staltmeir, München (DE); Thomas Wagner, München (DE); Ulf Friesen, München (DE)

(73) Assignee: Knorr-Bremse Systeme fur Schienenfahrzeuge GmbH, Munich (DE)

(*) Notice: Subject to any disclaimer, the term of this patent is extended or adjusted under 35 U.S.C. 154(b) by 10 days.

(21) Appl. No.: 10/467,713

(22) PCT Filed: Aug. 12, 2002

(86) PCT No.: PCT/EP02/00930
§ 371 (c)(1),
(2), (4) Date: Dec. 1, 2003

(87) PCT Pub. No.: WO02/064990
PCT Pub. Date: Aug. 22, 2002

(65) Prior Publication Data
US 2004/0069055 A1 Apr. 15, 2004

(30) Foreign Application Priority Data
Feb. 12, 2001 (DE) .......................... 101 06 378

(51) Int. Cl.[7] .............................................. G01M 17/08
(52) U.S. Cl. ........................................................ 73/121
(58) Field of Search .................... 73/121, 128, 129, 73/130, 131, 132

(56) References Cited

U.S. PATENT DOCUMENTS

| | | | |
|---|---|---|---|
| 4,607,729 A | * | 8/1986 | Staltmeir et al. ....... 188/153 R |
| 4,805,740 A | | 2/1989 | Wilke et al. |
| 5,961,190 A | * | 10/1999 | Brandmeier et al. ........ 303/152 |
| 5,969,270 A | | 10/1999 | Doemes et al. |
| 6,230,845 B1 | | 5/2001 | Yamakawa et al. |
| 6,345,225 B1 | * | 2/2002 | Bohm et al. .................. 701/70 |
| 6,397,981 B1 | * | 6/2002 | Tamasho et al. ........... 188/71.9 |
| 6,722,477 B1 | * | 4/2004 | Wolfsteiner et al. ....... 188/72.9 |
| 6,799,813 B2 | * | 10/2004 | Staltmeir ................. 303/119.3 |
| 6,802,211 B2 | * | 10/2004 | Schmidt ...................... 73/121 |
| 6,840,354 B2 | * | 1/2005 | Grundwurmer et al. .... 188/171 |
| 2001/0047684 A1 | * | 12/2001 | Schmidt ...................... 73/121 |
| 2004/0074709 A1 | * | 4/2004 | Krug et al. ................ 188/72.1 |
| 2005/0006948 A1 | * | 1/2005 | Friesen ........................ 303/20 |

FOREIGN PATENT DOCUMENTS

| | | |
|---|---|---|
| DE | 40 24 811 A1 | 2/1992 |
| DE | 299 23 681 U1 | 2/2001 |
| EP | 1 067 084 A1 | 2/2001 |
| JP | 61145426 | 7/1986 |

OTHER PUBLICATIONS

Hefter, Abstract of DE 3543456, (Jun. 11, 1987).
Korthaus et al., Abstract of DE 19607759, (May 28, 1997).
Loeffler, Abstract of DE 19828700, (Nov. 11, 1999).

* cited by examiner

Primary Examiner—Eric S. McCall
(74) Attorney, Agent, or Firm—Barens & Thornberg LLP

(57) ABSTRACT

An electromechanical brake tightening device for a rail vehicle, includes a brake actuator to apply and release brakes. The actuator has a power converter to convert energy supplied by the brake actuator to a brake application movement. The power converter includes a shear force measuring bolt and/or a brake lever, arranged in a power transmission path of the converter to measure braking power.

18 Claims, 1 Drawing Sheet

ELECTRO MECHANICAL BRAKE TIGHTENING DEVICE

BACKGROUND

The present disclosure relates to an electromechanical brake tightening device, particularly for a rail vehicle brake.

Currently, three braking systems are essentially used in the rail vehicle sector: Electropneumatic braking systems, electrohydraulic braking systems as well as electromechanical braking systems. The braking system may be constructed as an active or passive braking system, depending on whether the force of a brake actuator has to be applied for braking (active braking system) or for releasing the brake (passive braking system). In the event of operating disturbances, an energy accumulation takes place in compressed-air reservoirs in the case of electropneumatic systems, in hydraulic reservoirs in the case of electrohydraulic systems and, in the form of pre-loaded springs in the case of electromechanical systems.

From the prior art, electromechanical brake tightening devices for rail vehicles are known which have a brake actuator which comprises a service brake unit as well as an accumulator-type brake unit having an energy accumulator. The service brake unit contains a braking power generator for the application and/or release of the brake, for example, in the form of an electric motor drive. The accumulator-type brake unit comprises at least one energy accumulator for storing and supplying energy for the application of the brake as a service-type emergency brake in the sense of an underlying safety plane in the event of a failure of the service brake unit and/or as the parking brake. The accumulator-type brake unit is generally constructed as a spring-loaded brake.

A power converter provides a conversion of the energy supplied by the braking power generator and/or by the energy accumulator into a brake application movement. The electric-motor drive can be controlled by an electronic control and power system to carry out slip-controlled or load-corrected brakings. For the desired-actual comparison, values are required for the respectively present actual braking power, so that sensors for the direct braking power measurement or for measuring quantities from which the actual braking power can be derived have to be provided.

In the case of electropneumatic and electrohydraulic braking systems, pressure sensors are generally used for measuring the operating pressure existing in the compressed air or in the hydraulic liquid, from which operating pressure the amount of the momentary braking power can then be derived. However, such mediums do not exist in the case of electromechanical systems.

SUMMARY

The present disclosure relates to an electromechanical brake tightening device for a rail vehicle which permits a measuring of braking power in a simple and precise manner.

The electromechanical brake tightening device includes a brake actuator to apply and release brakes. The actuator has a power converter to converter energy supplied by the brake actuator to a brake application movement.The power converter includes a shear force measuring bolt and/or a brake lever, arranged in a power transmission path of the converter to measure a braking power.

The mechanical-to-electrical shear force measuring bolt combines two functions by converting power and simultaneously measuring power. For this reason, the brake tightening device according to the present disclosure, on the one hand, can have a small construction and, on the other hand, the number of component parts and the weight are reduced. The fact that the power or force sensor is directly integrated in the power flux or power transmission path of the power converter, in addition,results in a high measuring accuracy. For ensuring a reliable power transmission, the shear force measuring bolt can mechanically be designed to have a high fatigue strength.

According to an embodiment of the device, the shear force measuring bolt forms a hinge bolt of a hinge mutually connecting at least two power transmission elements of the power converter. The hinge couples a connecting rod, which can be linearly operated by the brake actuator, to a brake lever of an eccentric arrangement acting upon brake shoes. As a result, the power measuring point is in the direct vicinity of the point of the power effect, which is why the influence of disturbance variables, such as the bearing friction or hysteresis, is low, permitting very precise measurements.

An embodiment provides that the sensor measuring the braking power contains at least one strain gauge held on the circumference of the shear force measuring bolt. It is known that strain gauges have a high measuring precision with a simultaneously broad measuring range and are insensitive to temperature changes and pressure surges, which is applicable mainly in the case of the force effect occurring abruptly during emergency braking. Furthermore, they are distinguished by a good long-term stability as well as a high corrosion resistance.

According to another embodiment, redundant measuring sensors and/or redundant electronic sensor signal analyzing systems, particularly redundant measuring sensors with different measuring principles and/or redundant electronic sensor signal analyzing systems of different constructions and types are provided. Such a configuration may result in an increased reliability of the measuring arrangement. In addition, a plausibility check can be carried out by comparing the measuring signals of two or more measuring circuits.

Other aspects of the present disclosure will become apparent from the following descriptions when considered in conjunction with the accompanying drawings.

DRAWINGS

DETAILED DESCRIPTION OF THE DRAWINGS

Figure 1:
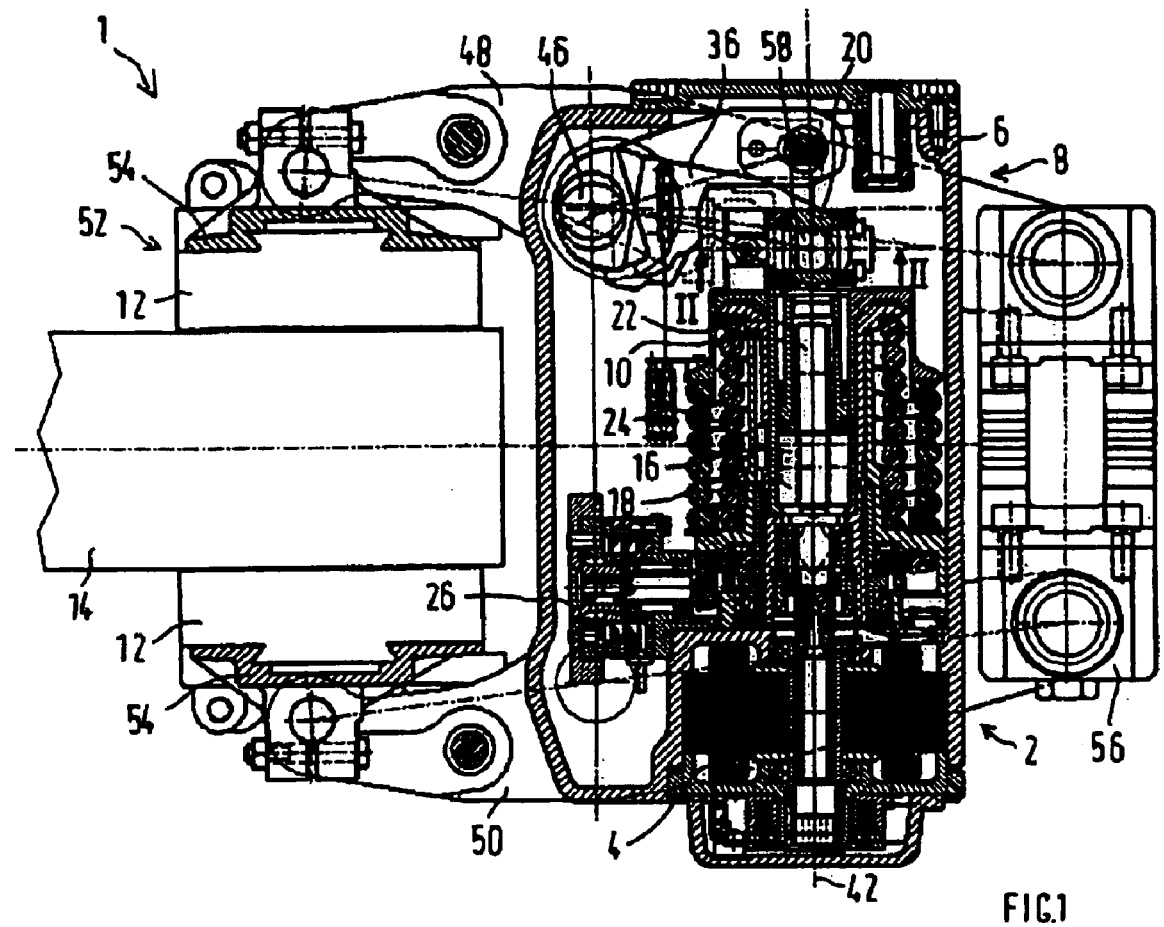
FIG. 1 is a sectional view of an embodiment of a brake actuator having an integrated shear force measuring bolt, according to the principles of the present disclosure.

An embodiment of an electromechanical brake tightening device 1, for a rail vehicle as shown in FIG. 1, includes a brake actuator 2 having a service brake unit and an accumulator-type brake unit. The service brake unit has an electric drive, for example, an electric servo motor 4, which is accommodated in an actuator housing 6 of the brake actuator 2. A mechanical power converter 8 is used for converting the energy supplied by the brake actuator 2 to a brake application movement.

The servo motor 4 causes a coaxial brake spindle 10 to carry out rotations which are converted by the power converter 8 to a brake application movement of brake pads 12 in the direction of a brake disk 14. The power converter 8 comprises, among other parts, a constructional spindle/nut unit 16 with a spindle nut 18 rotatably disposed on the brake spindle 10, which spindle nut 18 can carry out linear movements in a direction of the spindle axis when the brake spindle 10 is rotated. The end of the brake spindle 10 facing away from the servo motor 4 projects into a cylindrical hollow section of a connecting rod 20 which is connected in an axially fixed manner with the spindle nut 18. In addition, the cylindrical hollow section of the connecting rod 20 is held in an axially fixed manner in a sliding sleeve 22 against which at least one pre-loaded spring 24, which is supported on the actuator housing 6, is prestressed in a brake release position. The pre-loaded spring 24 is part of the accumulator-type brake unit. It is used as an energy accumulator for storing and supplying energy for applying the brake as a service-type emergency brake in the sense of a safety backup in the event of a failure of the service brake unit and/or as a parking brake. The service brake unit as well as the accumulator-type brake unit act upon the connecting rod 20. The pre-loaded spring 24 is held in the prestressed position by means of a locking device 26.

Figure 2:
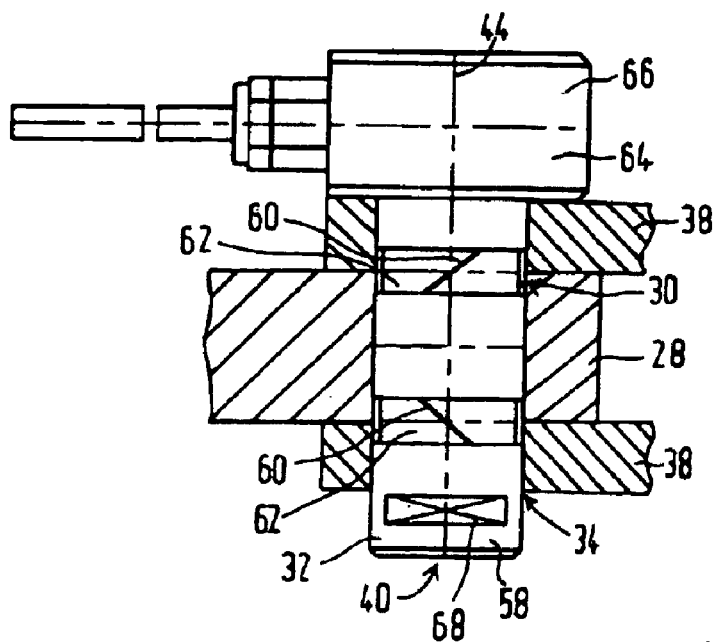
FIG. 2 is a sectional view of the shear force measuring bolt of FIG. 1 along Line II—II.

A plate-shaped connecting rod head 28 of the connecting rod 20 projects out of the sliding sleeve 22 and is provided with a connecting rod eye 30. As illustrated particularly in FIG. 2, a hinge bolt 32 extends through the connecting rod eye 30 as well as passage bores 34 coaxial thereto of cheeks 38 axially on both sides of the connecting rod eye 30 and head 28. The cheeks 38 are constructed at an end of a brake lever 36. The cheeks 38 of the brake lever 36, the connecting rod head 28 and the hinge bolt 32 together form a hinge 40 of the power converter 8, whereby the brake lever 36 is linked perpendicularly to the spindle axis 42 to the connecting rod 20. The brake lever 36 and connecting rod 20 are at least two power transmission elements of the power converter 8. When the brake spindle 10 is driven in a brake application direction or when the locking device 26 of the pre-loaded spring 24 is released, as a result of the then axially moving-out connecting rod 20, the hinge bolt 32 is stressed, among other things, by shear forces applied essentially perpendicular to the bolt axis 44.

The other end of the brake lever 36 acts upon an eccentric arrangement having an eccentric shaft 46 which is linked to a caliper lever 48 which, together with another caliper lever 50, forms a caliper 52. At one end of the calipers 48, 50, pad holders 54 are arranged which have brake pads 12 displaceable in a direction of an axis of the brake disk 14. Ends of the caliper levers 48, 50 facing away from the brake pads 12 are connected with one another by way of a plunger rod adjuster 56 which is preferably designed to be electrically operated. The described arrangement also forms a part of the power converter 8 which converts the moving-out motion of the connecting rod 20 caused by the servo motor 4 or by the pre-loaded spring to a brake application movement of the brake pads 12 in the direction of the brake disk 14.

According to the present disclosure, the hinge bolt 32 of the hinge 40 is formed by a shear force measuring bolt 58. The shear force measuring bolt is equipped with at least one measuring sensor 60 that measures quantities from which the braking power acting at the brake pads 12 can be derived in an indirect or direct manner. In an embodiment, the measuring sensor 60 may be formed by strain gauges (DMS) which are accommodated, for example, in recesses or grooves 62 extending around in a plane perpendicular to the bolt axis 44. The grooves 62 with the strain gauges 60 are situated in an area of axial junction points or planes of the connecting rod head 28 with the cheeks 38 of the brake lever 36 and therefore precisely in shearing planes of the shear force measuring bolt 58 stressed by shear. The strain gauges 60 are fastened to the circumference of the shear force measuring bolt 58 preferably by gluing in such a manner that they generate signals proportional to the shearing deformations of the shear force measuring bolt 58 caused by the shear forces acting in opposite directions, and supply these signals to an electronic analyzing system 64.

As an alternative, the grooves 62 may be eliminated and the strain gauges 60 may be fastened directly to an exterior surface of the shear force measuring bolt 58. According to another alternative or in addition, strain gauges 60 may be held in a hollow bore of the shear force measuring bolt 58 coaxial to the bolt axis 44. The shear force measuring bolt 58 may thus have a thin-walled construction. Instead of being fastened to the shear force measuring bolt 58, or in addition thereto, one or more strain gauges 60 may also be arranged on the brake lever 36, in order to be able to derive braking power from deformations of the brake lever 36.

Furthermore, any other type of measuring sensor can be used by which deformations of the shear force measuring bolt 58 and/or of the brake lever 36 occurring during operation can be measured. Thus, for example, pressure-measuring transducers may be integrated in the shear force measuring bolt 58 and may operate according to a capacitive, a piezoelectric or a piezoresistive principle. In order to achieve a reliability of the measuring arrangement which is as high as possible, the measuring sensors 60 and/or the electronic analyzing system 64 may be provided in a redundant manner. In particular, redundant measuring sensors 60 with different measuring principles and redundant electronic analyzing systems 64 of a different construction and type may also be present.

The shear force measuring bolt 58 has an end-side bolt head 66 which has an enlarged diameter and in which an electronic sensor signal analyzing system 64 is accommodated. The system 64 may be cast into the bolt head 66, whereby a vibration-damping or vibration-uncoupling accommodation is provided. In the embodiment strain gauges 60, the electronic analyzing system 64 may include a straingauge bridge circuit (not shown). In mounted condition, a face-side ring surface of the bolt head 66 impacts axially on an upper cheek 38 of the brake lever 36. The end of the shear force measuring bolt 58 pointing away from the bolt head 66 has two exterior grooves 68, which extend transversely with respect to the bolt axis 44, to receive a position-securing snap ring (not shown).

A conversion of shear deformation signals to signals for respective actual values for the momentary braking power acting at the brake pads 12 also takes place in the electronic analyzing system 64. Those signals are transmitted to a control and regulating device, which is not shown, in order to be able to set a desired braking power by a desired-actual comparison. Furthermore, the received signals for the actual values for the momentary braking power are used for monitoring the power input and the operability of the brake tightening device 1 during safety-relevant brakings. In addition, for verifying the measuring results, a motor current measured on a drive-side by a current sensor can be balanced with the signal for the actual values for the momentary braking power.

Although the present disclosure has been described and illustrated in detail, it is to be clearly understood that this is done by way of illustration and example only and is not to be taken by way of limitation. The spirit and scope of the present disclosure are to be limited only by the terms of the appended claims.

| | |
|---|---|
| 1 | Brake tightening device |
| 2 | brake actuator |
| 4 | servo motor |
| 6 | actuator housing |
| 8 | power converter |
| 10 | brake spindle |
| 12 | brake pad |
| 14 | brake disk |
| 16 | spindle-nut constructional unit |
| 18 | spindle nut |
| 20 | connecting rod |
| 22 | sliding sleeve |
| 24 | pre-loaded spring |
| 26 | locking device |
| 28 | connecting rod head |
| 30 | connecting rod eye |
| 32 | hinge bolt |
| 34 | passage bores |
| 36 | brake lever |
| 38 | cheeks |
| 40 | hinge |
| 42 | spindle axis |
| 44 | bolt axis |
| 46 | eccentric shaft |
| 48 | caliper lever |
| 50 | caliper lever |
| 52 | caliper |
| 54 | pad holder |
| 56 | plunger rod adjuster |
| 58 | shear force measuring bolt |
| 60 | measuring sensor (strain gauge) |
| 62 | grooves |
| 64 | electronic analyzing system |
| 66 | bolt head |
| 68 | exterior grooves. |

What is claimed is:

1. An electromechanical brake tightening device for a rail vehicle, comprising:
a brake actuator to apply and release brakes, having a power converter to convert energy supplied by the brake actuator to a brake application movement;
the power converter including at least one of a shear force measuring bolt and a brake lever, arranged in a power transmission path of the converter to measure a braking force:
the shear force measuring bolt being equipped with at least one measuring sensor measuring braking power at least one of indirectly and directly: and
wherein the shear force measuring bolt has an end-side bolt head which has an enlarged diameter and in which an electronic sensor signal analyzing system is arranged.

2. The electromechanical brake tightening device according to claim 1, wherein the shear force measuring bolt forms a hinge bolt of a hinge, mutually connecting at least two power transmission elements of the power converter.

3. The electromechanical brake tightening device according to claim 2, wherein the power transmission elements are a connecting rod and a brake lever, and the hinge connects the connecting rod, which is linearly operable by the brake actuator, with the brake lever that acts on an eccentric arrangement acting upon brake pads.

4. The electromechanical brake tightening device according to claim 3, wherein the shear force measuring bolt projects through a connecting rod head of the connecting rod and through passage bores coaxial thereto of cheeks of the brake lever axially on both sides of the connecting rod head.

5. The electromechanical brake tightening device according to claim 1, wherein the brake lever acts upon an eccentric arrangement having an eccentric shaft which is linked to at least one caliper lever which, together with another caliper lever, forms a caliper, and pad holders with brake pads are arranged at ends of each of the caliper levers, which brake pads are displaceable in a direction of an axis of a brake disk.

6. The electromechanical brake tightening device according to claim 1, wherein the at least one measuring sensor includes least one strain gauge held on at least one of a circumference of the shear force measuring bolt and a circumference of the brake lever.

7. The electromechanical brake tightening device according to claim 1, wherein the at least one measuring sensor includes at least one strain gauge held in a hollow bore of a thin-walled shear force measuring bolt.

8. The electromechanical brake tightening device according to claim 6, wherein recesses accommodating the at least one strain gauge are provided on the circumference of the shear force measuring bolt, which recesses are situated in an area of axial junction planes of a connecting rod head with cheeks of the brake lever.

9. The electromechanical brake tightening device according to claim 1, further including at least one measuring sensor measuring braking power and including at least one pressure-measuring transducer integrated in the shear force measuring bolt and operating according to one of a capacitive, piezoelectric and piezoresistive principle.

10. The electromechanical brake tightening device according to claim 1, wherein the electronic sensor signal analyzing system is cast into the bolt head such that at least one of vibration-damping and vibration-uncoupling is provided.

11. The electromechanical brake tightening device according to claim 1, wherein at least one of redundant measuring sensors and redundant electronic sensor signal analyzing systems, are provided.

12. The electromechanical brake tightening device according to claim 1, further including a measuring sensor, by which actual values of momentary braking power are supplied as signals to a regulating device.

13. The electromechanical brake tightening device according to claim 1, wherein the brake actuator includes an electric motor whose motor current can be detected by a current sensor.

14. The electromechanical brake tightening device according to claim 13, wherein a signal for the motor current can be balanced with a signal for the braking power.

15. The electromechanical brake tightening device according to claim 1, wherein the at least one measuring sensor measures the braking power directly.

16. The electromechanical brake tightening device according to claim 1, wherein the at least one measuring sensor measures the braking power indirectly.

17. The electromechanical brake application device according to claim 11, wherein the redundant sensors include different measuring principles.

18. The electromechanical brake tightening device according to claim 11, wherein the redundant electronic sensor signal analyzing systems are of different construction.

* * * * *

UNITED STATES PATENT AND TRADEMARK OFFICE
CERTIFICATE OF CORRECTION

PATENT NO.    : 6,957,571 B2
DATED         : October 25, 2005
INVENTOR(S)   : Josef Staltmeir et al.

It is certified that error appears in the above-identified patent and that said Letters Patent is hereby corrected as shown below:

Title page,
Item [22], PCT Filed, should read -- January 30, 2002 --.

Signed and Sealed this

Seventeenth Day of January, 2006

JON W. DUDAS
*Director of the United States Patent and Trademark Office*